United States Patent [19]

Busbridge et al.

[11] Patent Number: 5,257,347
[45] Date of Patent: Oct. 26, 1993

[54] DISPLAY METHODS AND APPARATUS

[75] Inventors: Michael L. Busbridge, Rochester; David J. Puleston, Canterbury, both of England

[73] Assignee: GEC - Marconi Limited, England

[21] Appl. No.: 711,667

[22] Filed: Jun. 6, 1991

Related U.S. Application Data

[63] Continuation of Ser. No. 416,543, Oct. 3, 1989, abandoned, which is a continuation-in-part of Ser. No. 20,459, Mar. 2, 1987, abandoned.

[51] Int. Cl.$^5$ .............................................. G06F 15/00
[52] U.S. Cl. ...................................... 395/129; 395/142
[58] Field of Search ................. 340/747, 750; 395/129, 395/132, 142, 162

[56] References Cited

U.S. PATENT DOCUMENTS

| | | | |
|---|---|---|---|
| 3,582,701 | 6/1971 | Zeliclis | 313/472 |
| 3,654,505 | 4/1972 | Davis et al. | 313/472 |
| 3,884,694 | 9/1975 | Gallare et al. | 96/30 |
| 4,213,252 | 7/1980 | Collivian et al. | 35/624 |
| 4,338,637 | 7/1982 | Ueno | 35/288 |
| 4,343,037 | 8/1982 | Bolton | 364/521 |
| 4,583,185 | 4/1986 | Heartz | 364/521 |
| 4,644,503 | 2/1987 | Bantz et al. | 365/230 |
| 4,715,005 | 12/1987 | Heartz | 364/521 |

Primary Examiner—Phu K. Nguyen
Attorney, Agent, or Firm—Kirschstein, Ottinger, Israel & Schiffmiller

[57] ABSTRACT

A display method and apparatus in which a two-dimensional display constituting a perspective view of a three-dimensional surface consists of an array of discrete points appearing to model the surface. An aircraft pilot is provided with a display of ground terrain ahead of his aircraft using stored data representing the terrain.

12 Claims, 2 Drawing Sheets

DISPLAY METHODS AND APPARATUS

CROSS-REFERENCE TO RELATED APPLICATIONS

This application is a continuation of Ser. No. 07/416,543, filed Oct. 3, 1989, abandoned, which, in turn, is a continuation-in-part of Ser. No. 07/20,459, filed Mar. 2, 1987, abandoned.

BACKGROUND OF THE INVENTION

1. Field of the Invention

This invention relates to display methods and apparatus.

More particularly the invention relates to such methods and apparatus for using data representing a three-dimensional surface to produce a two-dimensional display constituting a perspective view of the surface.

In the present specification the term perspective view includes a quasi-perspective view, e.g. an isometric view.

One particular application of such methods and apparatus is in an aircraft for providing a pilot with a real time display of the ground terrain ahead of the aircraft e.g. to assist navigation in poor visibility.

2. Description of Related Art

In known such methods and apparatus the display comprises a grid of lines appearing to conform to the surface. However such a representation of the surface is found by users to be aesthetically rather unsatisfactory, and it is an object of the present invention to provide a display of more satisfactory form in this respect.

SUMMARY OF THE INVENTION

According to a first aspect of the present invention there is provided a method of using data representing a three-dimensional surface to provide a two-dimensional display constituting a perspective view of the surface, comprising the step of so using the data that said display comprises an array of identical discrete elements which viewed together appear to model said surface solely by virtue of their relative positions, each said element corresponding to a respective point in said surface, each said point being spaced in a given direction from a respective intersection of lines of a regular grid of lines lying in a base plane of the surface.

According to a second aspect of the present invention there is provided an apparatus for using data representing a three-dimensional surface to provide a two-dimensional display constituting a perspective view of the surface comprising means for so using said data that said display comprises an array of identical discrete elements which viewed together appear to model said surface solely by virtue of their relative positions, each said element corresponding to a respective point in said surface, each said point being spaced in a given direction from a respective intersection of lines of a regular grid of lines lying in a base plane of the surface.

In one particular embodiment of such apparatus the apparatus comprises: storage means for storing said data; means for utilizing said stored data to produce first signals representing the positions in a three-dimensional coordinate system of each said point represented by said data; means for utilizing said first signals to produce second signals representing the positions of each of said points in said two-dimensional perspective view of said surface; and means for utilizing said second signals to produce said display.

It will be appreciated that when the surface is a non-transparent surface, the elements relating to hidden parts of the surface in the perspective view are preferably not displayed.

In a method and apparatus in accordance with the invention the display produced may also be arranged to provide emphasis of selected features of the display e.g. the edges of upstanding features in the perspective view which, if the surface is non-transparent, conceal more distant portions of said surface in the perspective view. Such emphasis is suitably in the form of continuous lines.

In a method or apparatus according to the invention said elements are suitably dots.

BRIEF DESCRIPTION OF THE DRAWINGS

One method and apparatus in accordance with the invention will now be described, by way of example, with reference to the accompanying drawings in which.

DETAILED DESCRIPTION OF THE PREFERRED EMBODIMENT

The apparatus is intended for use in an aircraft to provide the pilot or other observer in the aircraft with a real time display of the ground terrain ahead of the aircraft.

Figure 1:
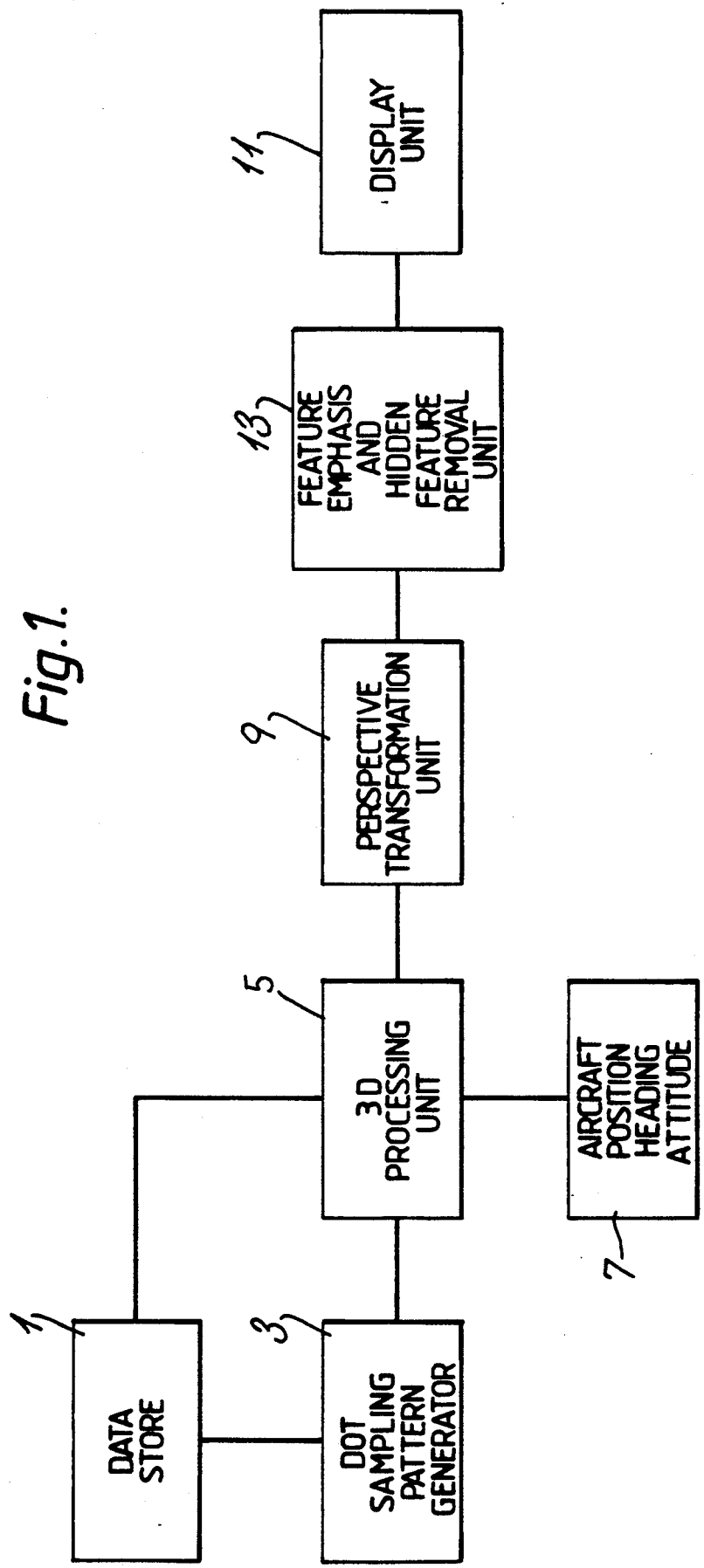
FIG. 1 is a schematic diagram of the apparatus.

Referring to FIG. 1, the apparatus includes a digital data store 1 in which is stored a representation of the earth's surface in the locality in which the aircraft is to fly. The representation is typically in the form of an array of values, each of which values represents the vertical height above a base plane of a respective point on the earth's surface, each point being vertically above a respective intersection point of a regular nominally rectangular grid of lines in the base plane.

The data stored in the store 1 thus comprises data of the kind contained in Digital Land Mass Survey—Digital Terrain Elevation Data (DLMS DTED) data bases such as are available from the Defense Mapping Agency in the United States of America and the Mapping and Charting Establishment RE, Feltham in the United Kingdom.

The apparatus further includes a dot sampling pattern generator 3 which causes data to be passed from the store 1 to a 3D processing unit 5 and controls the unit 5 so as to enable the unit 5 to produce at its output x, y and z signals in respect of each point, where x and y indicate the coordinates of the projection of the point on the base plane and z indicates the height of the point above the base plane.

The processing unit 5 also receives from a unit 7 an input representing the aircraft's position, heading and attitude so that the output signal of the unit 5 relates to the ground terrain ahead of the aircraft in its direction of flight correctly adjusted for pitch and roll.

The 3D processing unit 5 produces the x, y and z signals by performing three-dimensional translational and rotational transformations on the data caused to be passed from the store 1 to the unit 5 by the dot sampling pattern generator 3. The principles of these transformations are described in the book: 'Principles of Interactive Computer Graphics', Second Edition: International Student Edition, by W. M. Newman and R. F. Sproull, Publishers: McGraw-Hill International Book Company (Library of Congress Cataloging in Publication Data: ISBN 0-07-046338-7), in particular page 334 thereof, which is hereby incorporated by reference.

The output of the processing unit 5 is passed to a perspective transformation unit 9 which uses a transformation algorithm to convert the three-dimensional coordinate input signals x, y, z to two-dimensional coordinate signals, x', y' which indicate the position of each point represented in the output of the unit 5 in a two-dimensional perspective view from the position of the aircraft of the surface which the points represent. The principles of the transformation performed by the perspective transformation unit 9 are also described in the above mentioned book: 'Principles of Interactive Computer Graphics', more particularly on page 341 thereof.

The output of the transformation unit 9 is passed to a display unit 11, typically a raster scanning cathode ray tube display unit, via a feature emphasis and hidden feature removal unit 13.

The unit 13 suppresses all the x', y' signals relating to those points which lie in parts of the ground terrain ahead of the aircraft which will be hidden in the two-dimensional perspective view by virtue of the non-transparency of the surface. The technique used for hidden feature removal by the unit 13 is described on pages 372, 373, 380 and 381 of the above mentioned book: 'Principles of Interactive Computer Graphics'.

The unit 13 further generates signals representing lines extending along the edges of upstanding features of the perspective view which conceal more distance portions of the perspective view i.e. so-called ridge lines. The principles of such feature emphasis by the unit 13 are described on pages 390, 402 and 405 of the above mentioned book: 'Principles of Interactive Computer Graphics'.

The display unit 11 provides a display having a visible portion at each position represented by the x', y' signals at the output of the unit 13. The display thus comprises an array of discrete dots which appears to model the ground terrain ahead of the aircraft, as viewed from the perspective of the aircraft. In addition, the display has continuous lines extending along the ridge lines of the displayed perspective view.

It will be appreciated that if desired the unit 13 may be omitted.

Figure 2:
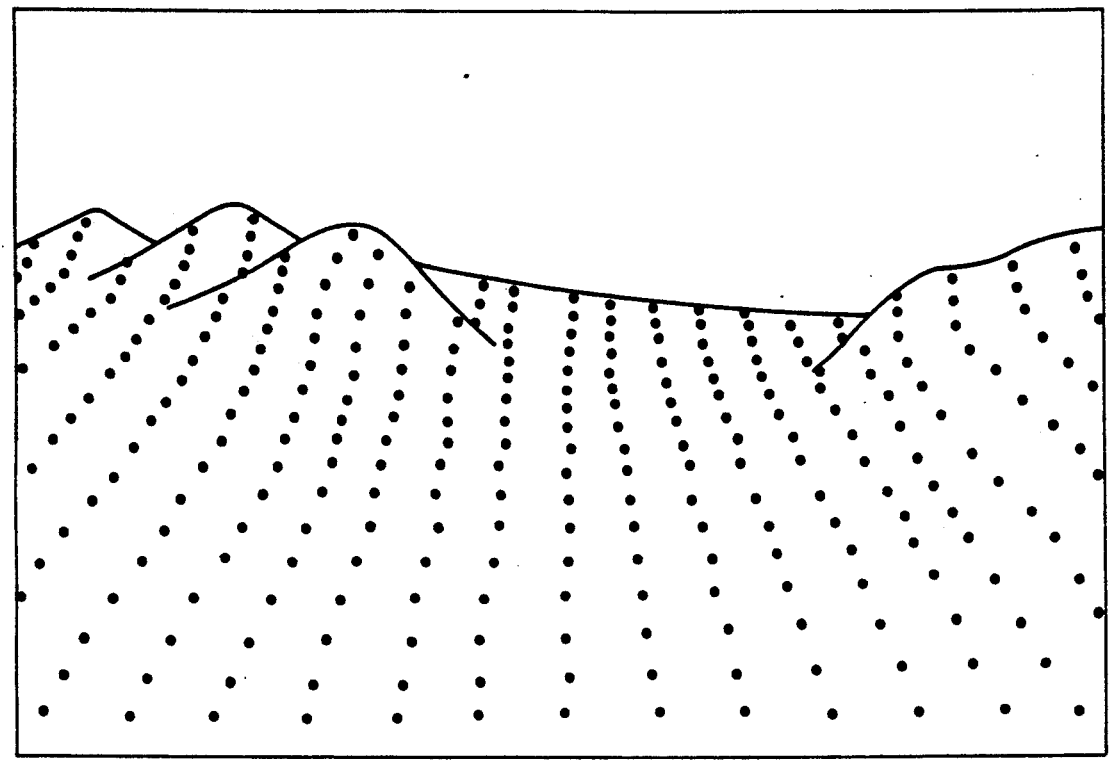
FIG. 2 illustrates a display produced by the apparatus.
Figure 3:
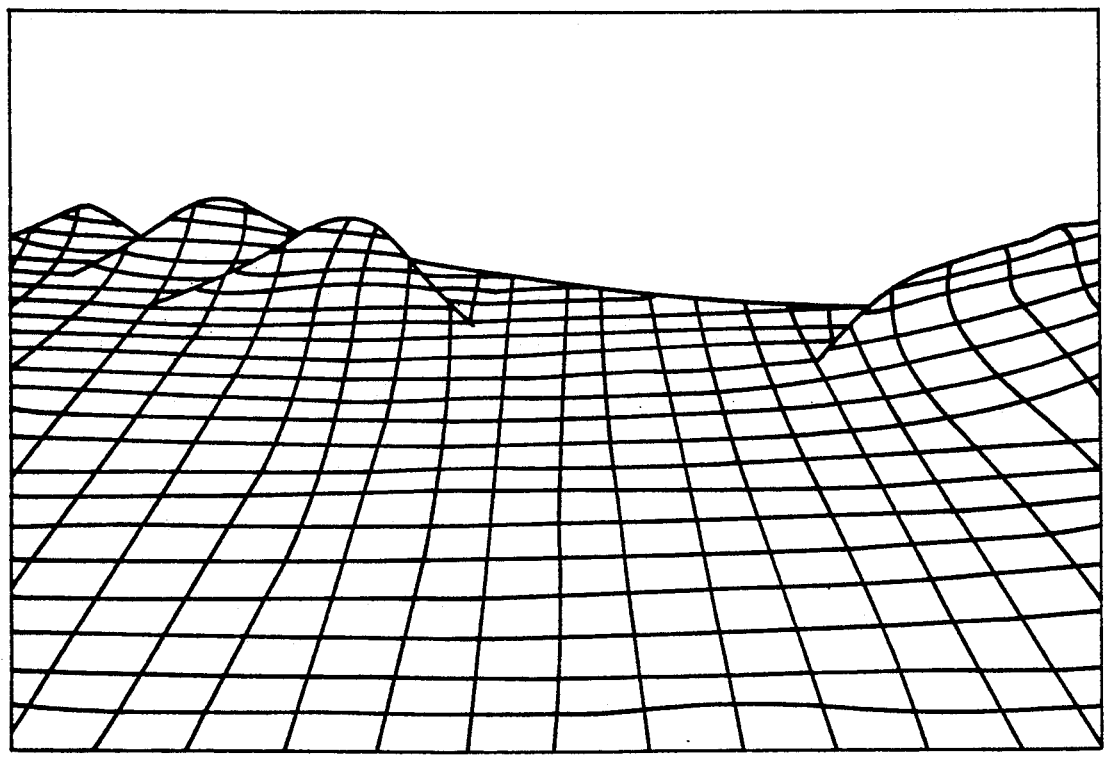
FIG. 3 illustrates a corresponding display produced by known apparatus according to the prior art.

An example of the display produced is shown in FIG. 2. FIG. 3 illustrates a display of the same terrain obtained with conventional display apparatus wherein the display produced comprises a grid of continuous lines conforming to the surface of the terrain.

It will be appreciated that the difference between such conventional display apparatus and the apparatus in accordance with the present invention shown in FIG. 1 is that the conventional display apparatus processes data corresponding to lines, whereas the apparatus of FIG. 1 processes data corresponding to dots only, i.e. the invention of the present application resides in using the data in the data store 1 to produce a two dimensional perspective terrain display comprising dots, rather than lines. It will thus be understood that the display of an apparatus according to the invention to all intents and purposes comprises points along the lengths of lines such as might constitute the display produced by a conventional display apparatus, and that a conventional display apparatus can therefore very easily be modified by one of ordinary skill in the art for use as a display apparatus according to the present invention.

In addition to providing a display more aesthetically satisfying than known methods and apparatus, a method and apparatus according to the invention has obvious computational speed advantages compared with known methods and apparatus, especially when utilising stored data of the DLMS DTED data base type. Furthermore, since only discrete dots, with the possible addition of ridge lines, are used to provide the required surface perspective view, additional visual data, such as flight and target symbology, added to the display can be more readily assimilated by the viewer. Moreover, when presented as a head-up display, a dot display according to the invention does not block out the real world image, whether direct or artificial e.g. presented by a forward looking infra red system, to the same extent as a continuous line display.

We claim:

1. A method of using data representing a three-dimensional surface to produce a two-dimensional display constituting a perspective view of said surface, comprising the steps of: performing three-dimensional translational and rotational transformations on said data to produce first signals representing the positions in a three-dimensional coordinate system of points in said surface, each said point being spaced in a given direction from a respective intersection of lines of a theoretical regular grid of lines lying in a base plane of the surface; utilizing a transformation algorithm to transform said first signals to display signals representing the positions of said points in a said two-dimensional perspective view of said surface; and using said display signals to produce a said two-dimensional display which comprises discrete elements of identical size and shape whose positions are so spaced relative to one another as to correspond to respective said points in said surface thereby to model said surface.

2. A method according to claim 1; and further comprising the step of suppressing those of the display signals representing the positions of points in said surface which will be hidden from view in said perspective view if said surface is non-transparent prior to said using step.

3. A method according to claim 1, including the further steps of selecting features of said perspective view and producing in said display continuous emphasis lines emphasizing said selected features of said perspective view.

4. A method according to claim 3, wherein said selected features comprise upstanding features in said perspective view and said emphasis lines extend along the edges of said upstanding features which, if said surface is non-transparent, conceal more distant portions of said surface in said perspective view.

5. A method according to claim 1, wherein said elements are dots.

6. A method according to claim 1, wherein said surface is the ground terrain in a locality in which an aircraft is to fly.

7. A method according to claim 6, wherein said perspective view is a perspective view of said ground terrain ahead of the aircraft substantially from the position of the aircraft.

8. An apparatus for using data representing a three-dimensional surface to produce a two-dimensional display constituting a perspective view of said surface comprising: storage means for storing said data; means for performing three-dimensional translational and rotational transformations on said stored data to produce first signals representing the positions in a three-dimensional coordinate system of points in said surface, each said point being spaced in a given direction from a respective intersection of lines of a theoretical regular grid of lines lying in a base plane of the surface; means for utilizing a transformation algorithm to transform said first signals to display signals representing the positions of each of said points in a said two-dimensional perspective view of said surface; and means for using said display signals to produce a said two-dimensional display which comprises discrete elements of identical size and shape whose positions are so spaced relative to one another as to correspond to respective said points in said surface thereby to model said surface.

9. An apparatus according to claim 8, including means for suppressing those of said display signals representing the positions of points in said surface which will be hidden from view in said perspective view if said surface is non-transparent.

10. An apparatus according to claim 8, wherein said means for utilizing said transformation algorithm also selects features of said perspective view and produces second signals representing continuous emphasis lines to emphasize in said display said selected features of said perspective view.

11. An apparatus according to claim 10, wherein said selected features comprise upstanding features in said perspective view and said emphasis lines extend along the edges of said upstanding features in said perspective view which, if said surface is non-transparent, conceal more distant portions of said surface in said perspective view.

12. An apparatus according to claim 8, wherein said elements are dots.

* * * * *